United States Patent
Mutel et al.

(10) Patent No.: US 7,328,154 B2
(45) Date of Patent: Feb. 5, 2008

(54) BUBBLE SPLITTING FOR COMPACT ACOUSTIC MODELING

(75) Inventors: Ambroise Mutel, Nancy (FR); Patrick Nguyen, Santa Barbara, CA (US); Luca Rigazio, Santa Barbara, CA (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 871 days.

(21) Appl. No.: 10/639,974

(22) Filed: Aug. 13, 2003

(65) Prior Publication Data

US 2005/0038655 A1  Feb. 17, 2005

(51) Int. Cl.
*G10L 15/00* (2006.01)

(52) U.S. Cl. ........................ 704/245; 704/234
(58) Field of Classification Search ............. 704/234, 704/245
See application file for complete search history.

(56) References Cited

U.S. PATENT DOCUMENTS 5,983,178 A * 11/1999 Naito et al. ................. 704/245
6,073,096 A *  6/2000 Gao et al. ................... 704/245
6,442,519 B1 *  8/2002 Kanevsky et al. .......... 704/243
6,567,776 B1 *  5/2003 Chang et al. ............... 704/236
6,697,778 B1 *  2/2004 Kuhn et al. ................. 704/243

OTHER PUBLICATIONS

Hubert Jin, Spyros Matsoukas, Richard Schwartz, Francis Kubala, 'Fast Robust Inverse Transform SAT and Multi-stage Adaptation', http://www.itl.nist.gov/iaui/894.01/publications/darpa98/html/am20/am20.htm, The translation was initiated by Hubert Jin on Mon Mar. 30 16:48:02 EST 1998.*
Naito M., et al. "Speaker Clustering for Speech Recognition Using Vocal Tract Parameters" Speech Communication elsevier, vol. 36, No. 3-4, Mar. 2002, pp. 305-315.
Anastasakos T., et al. "A Compact Model for Speaker-Adaptive Training" Spoken Language, 1996. ICSLP 96. Proceedings., Fourth International Conference on Philadelphia, PA, USA Oct. 3-6, 1996.

(Continued)

*Primary Examiner*—David Hudspeth
*Assistant Examiner*—Justin W. Rider
(74) *Attorney, Agent, or Firm*—Harness Dickey & Pierce P.L.C.

(57) ABSTRACT

An improved method is provided for constructing compact acoustic models for use in a speech recognizer. The method includes: partitioning speech data from a plurality of training speakers according to at least one speech related criteria (i.e., vocal tract length); grouping together the partitioned speech data from training speakers having a similar speech characteristic; and training an acoustic bubble model for each group using the speech data within the group.

13 Claims, 10 Drawing Sheets

OTHER PUBLICATIONS

Jin H. et al., "Fast Robust Inverse Transform Speaker Adapted Training Using Diagonal Transformations", Proceedings of the 1998 IEEE International Conference on Acoustics, Speech and Signal Processing, May 12, 1998, pp. 785-788, XP010279344.

Wei Zhang et al., Continuous Speech Recognition Using an On-line SpeakerAdaptation Method Based on Automatic Speaker Clustering: IEICE Tarnsactions on Information and Systems Inst. Electron. Inf. & Commun. Eng. Japan.

Thiele F. et al., "A Comparative study of Model-Based Adaptation Techniques for a Compact Speech Recognizer" Proceedings of IEEE Workshop on Automatic speech Recognition and Understanding, Dec. 9, 2001,—Dec. 13 2201 pp. 29-32, XP010603670.

Ambroise Mutel, "Adaptation/ Normalization" Aug. 28, 2003, Institute Eurecom, Nice, France, XP002301298.

S. Matsoukas, R. Schwartz, H. Jin, L. Nguyen, "Practical Implementations of Speaker-Adaptive Training", BBN Systems and Technologies, 70 Fawcett Street, Cambridge, MA 02138, 1996.

M. Pitz, S. Molau, R. Schluter, H. Ney, "Vocal Tract Normalization Equals Linear Transformation in Cepstral Space", Lehrstuhl fur Informatik VI, Computer Science Department, RWTH Aachen—University of Technology, Germany 2001.

T. Anastasakos, J. McDonough, R. Schwartz, J. Makhoul, "A Compact Model for Speaker-Adaptive Training", BBN Systems and Technologies 70 Fawcett Street, Cambridge MA 02138.

P. Zhan, A. Waibel, "Vocal Tract Length Normalization for Large Vocabulary Continuous Speech Recognition", May 1997 CMU-CS-97-148.

* cited by examiner

BUBBLE SPLITTING FOR COMPACT ACOUSTIC MODELING

FIELD OF THE INVENTION

The present invention relates to speech recognition and, more particularly to an optimized technique for training compact acoustic models for use in a speech recognizer.

BACKGROUND OF THE INVENTION

Applications for very large vocabulary continuous speech recognition systems include multimedia indexing and call center automation. A very large speech database is needed to train a single acoustic model employed by such speech recognition systems. Typically, the acoustic model is speaker-independent and gender-independent; i.e., the model was trained with data from many different speakers, both male and female. A major difficulty in modeling speaker-independent continuous speech is that important variations in the speech signal are caused by inter-speaker variability, such that the spectral distributions have higher variance than corresponding speaker-dependent distributions. As a result, overlap between different speech units leads to weak discriminative power.

Speaker adaptive training is a method of estimating the parameters of continuous density HMMs for speaker independent continuous speech recognition. It aims at reducing inter-speaker variability in order to get enhanced speaker independent models. By reducing the inter-speaker variability, speaker adaptive training finds a speaker-independent acoustic model that could be seen as a compact central point in the database. This model will be compact with reduced variance and well suited for adaptation. However, though this method of constructing an acoustic model is a powerful one, the performance of speaker adaptive training on extremely large databases soon reaches a limit. Intuitively, it is impossible to find one unique compact acoustic model that models the entire database with accuracy.

Therefore, it is desirable to provide an improved technique for constructing compact acoustic models for use in a very large vocabulary continuous speech recognition system.

SUMMARY OF THE INVENTION

In accordance with the present invention, a method is provided for constructing compact acoustic models for use in a speech recognizer. The method includes: partitioning speech data from a plurality of training speakers according to at least one speech related criteria; grouping together the partitioned speech data from training speakers having a similar speech characteristic; and training an acoustic bubble model for each group using the speech data within the group. Each acoustic bubble model may be further compacted using various normalization techniques.

In another aspect of the present invention, a method is provided for defining a vocal tract length normalizing transform for use in speech processing. The method includes: extracting a first set of acoustic vectors from training speech from a speaker exhibiting a known vocal tract length; warping a frequency axis of a power spectrum of the speech, thereby defining warped speech indicative of a different vocal tract length; extracting a second set of acoustic vectors from the warped speech; and estimating a linear transformation matrix for the first and second set of acoustic vectors using a least square technique.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
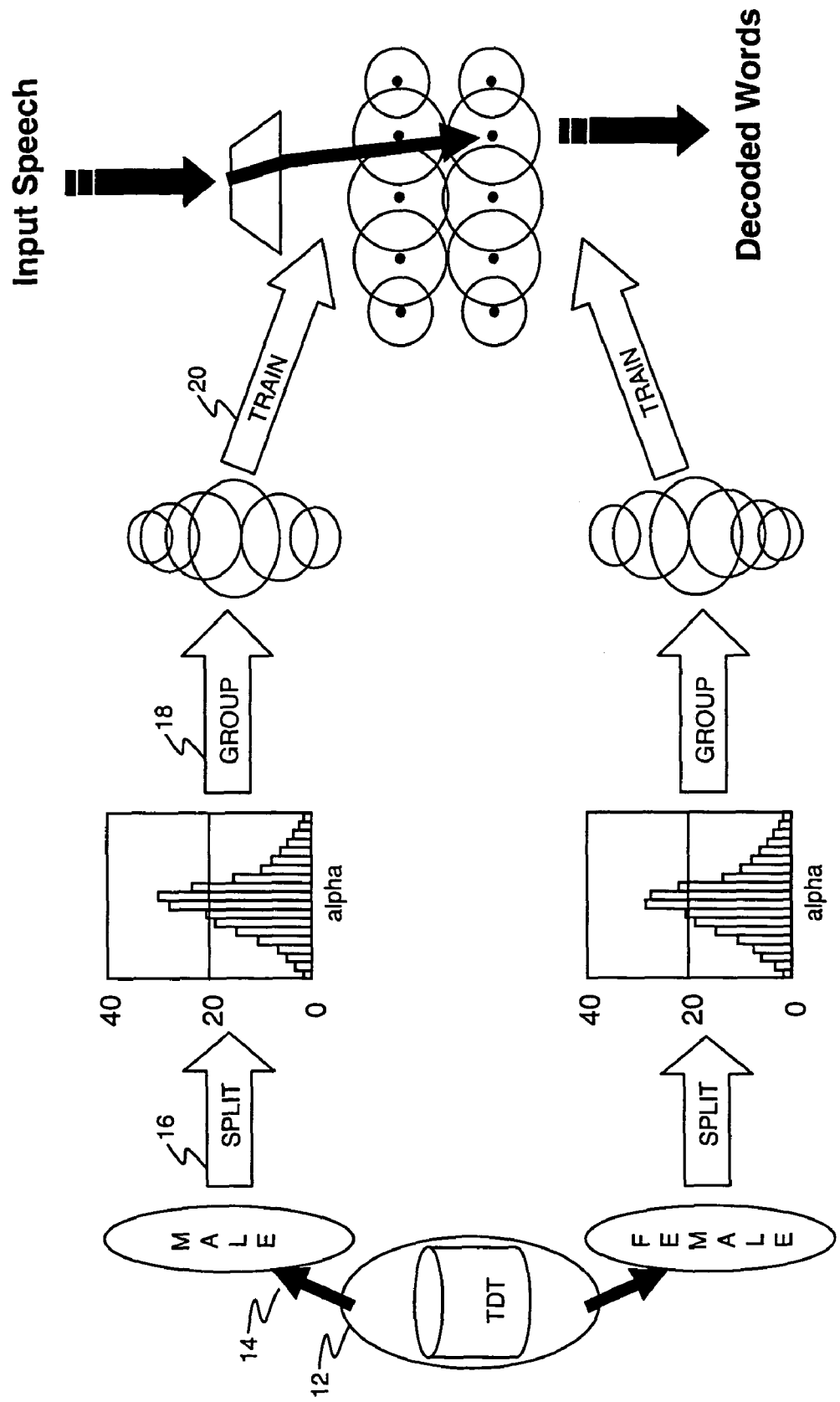
FIG. 1 is a diagram illustrating a method of constructing compact acoustic models in accordance with the present invention.

FIG. 1 illustrates a method for constructing compact acoustic models in accordance with the present invention. This technique aims at optimizing the training of acoustic models by handling the variability of the speech database more efficiently. The basic idea underlying the process is to obtain additive gain from splitting the training set to form homogeneous speaker groups and then training an acoustic bubble model for each group using the speech data within the group.

A relatively large training database 12 serves as the starting point for constructing compact acoustic models. The training database 12 includes speech data from a plurality of training speakers as is well known in the art. The speech data in the training database is first "split" or partitioned according to a one-dimensional speech parameter as shown at 16.

Vocal tract length normalization (VTLN) has been widely used in speech recognition to compensate for inter-speaker variability. Here, vocal tract length is the speech criteria preferably used to split the training database. However, it is readily understood that other speech related criteria may be used to split the database. Speech related criteria may be selected from the group including (but not limited to) environmental related criterion (e.g., background noise), speaker related criterion (e.g., native language of the speaker, dialect of the speaker, age of the speaker, gender of the speaker) and speech input channel criterion (e.g., microphone type), or combinations thereof.

In general, vocal tract length normalization estimates the vocal tract length scaling factor (also referred to as the warping factor) for each speaker or utterance and then normalizes the speech signal to an average vocal tract length so that the parameterized speech is independent of this type of inter-speaker variation. In particular, vocal tract length normalization cancels inter-speaker variability induced by the vocal tract length of each speaker by warping the frequency axis of the power spectrum according to a warping function:

$$\phi_\alpha : [0, \pi] \to [0, \pi],$$
$$\omega \to \tilde{\omega} = \phi_\alpha(\omega)$$
(1)

where $\Phi$ is the warping function and $\alpha$ is the warping factor.

By positing that VTLN is equivalent to linear transform in the cepstral domain, a new approach is proposed for a VTLN framework. In fact, if we consider the cepstral coefficients $c_k$ for k in [0 ... K], where $\omega$ denotes only the true physical frequency scale, there is a linear relationship with the n-th cepstral coefficient of the warped spectrum, $\tilde{c}_n(\alpha)$, that can be written as follows:

$$\tilde{c}_n(\alpha) = \sum_{k=0}^{K} A_{nk}(\alpha) c_k,$$
(2)

with $$A_{nk}(\alpha) = \frac{2}{\pi} \int_0^\pi \cos(\tilde{\omega} n) \cos(\phi_\alpha^{(-1)}(\tilde{\omega}) k) d\tilde{\omega},$$
(3)

where $\tilde{\omega} = \phi_\alpha(\omega)$. It is readily understood the linear form $A_{nk}(\alpha)$ depends on the chosen warping function, and extracting a closed-form solution for both piecewise and bilinear cases. However, it is also known that the speaker-specific Mel-scale is better than piecewise/bilinear warping VTLN in frequency domain:

$$M_\alpha(f) = 1127 \log\left(1 + \frac{f}{700\alpha}\right),$$
(4)

so that a linear transformation exists between cepstral coefficient $c_k$ and cepstral coefficient of the warped spectrum, but unfortunately there are no closed-form solution to that equation if we take the Mel-scale into account. However, if you take the previous equation as a warping function, it is straightforward to find the following equation, for which only approximations or numerical solutions can be found.

$$A_{nk}(\alpha) = cste \int_0^{M_\alpha(\pi)} \frac{\cos\{M_\alpha(\omega)n\} \cos(\omega k)}{\alpha \alpha_0 = \omega} d\omega.$$
(5)

VTLN equals the linear transform in ceptral domain means that the entire framework can be replaced with a predefined number of linear transforms. For example, we employ fifteen linear transforms corresponding to the warping factors $\alpha \in [0.86; 1.14]$ with step of 0.02. As no closed form linear solution does exist with the Mel-scale, we can estimate the solution. In one exemplary embodiment, the feature space contains observations vectors of dimension 39 (i.e., calculate 23 filter-bank coefficients and derive 13 cepstral coefficients via the discrete cosine transform and filtering). These cepstral coefficients are combined with their first derivative, (x'(t)), and second derivative, (x''(t)) to generate a 39-dimensional vector. If $\tilde{o}(t)$ represents the vector from the stretched or compressed spectrum and o(t) the same vector with $\alpha=1$, according to equation (2), the linear relationship can be expressed as:

$$\tilde{o}(t) = A_\alpha o(t) = A_\alpha \begin{bmatrix} x(t) \\ x'(t) \\ x''(t) \end{bmatrix},$$
(6)

where $A_\alpha$ is the 39×39 linear transform between both of them. While the description is provided with reference to a particular construct for the observation vector, it is readily understood that other constructs are also within the scope of the present invention.

To obtain a more robust result, we will not consider a simple vector, but an entire parameter file. Each of those parameter files consists of more than one hour of speech. Now, the linear relationship can be expressed as:

$$Y_\alpha = A_\alpha X,$$
(7)

where X represents the entire parameter file with $\alpha=1$ and Y represents the file generated by modifying directly the Mel-scale with another value of $\alpha$. It is now straightforward to estimate VTLN matrices with the least square method:

$$A_\alpha = (X^T X)^{-1} X^T Y_\alpha.$$
(8)

Figure 2:
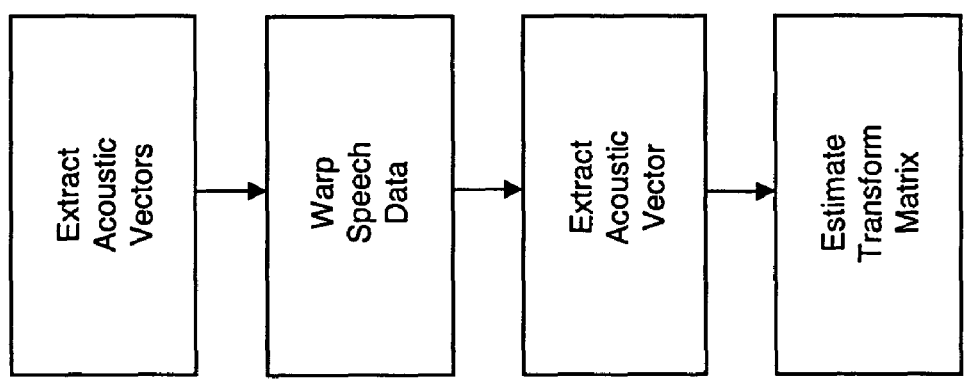
FIG. 2 is a flowchart depicting a method for defining a vocal tract length normalization transform in accordance with the present invention.

Referring to FIG. 2, the vocal tract length normalization transforms may be estimated directly from the experimental data. The existence of a linear solution to the VTLN warping problem is known, such that the solution exists, is unique and can be experimentally computed.

Figure 3:
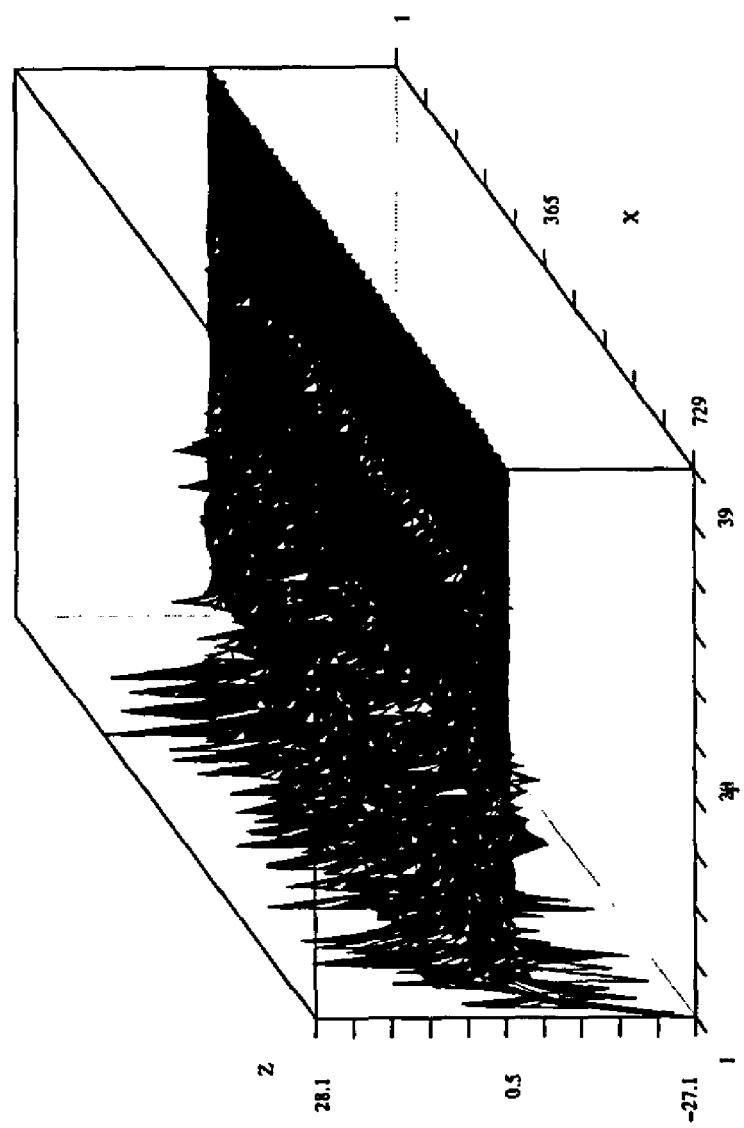
FIG. 3 is a graph visualizing a frame of cepstral coefficients and their first and second derivatives derived from speech data having no warping.

First, a set of acoustic vectors is first extracted from speech data from a training speaker having a known vocal tract length. In an exemplary embodiment, the feature space contains observations vectors of dimension 39. Specifically, the vector includes 23 calculated filter-bank coefficients and 12 cepstral coefficients derived via the discrete cosine transform and filtering. In addition, the energy coefficient is added to obtain 13 cepstral coefficients. The cepstral coefficients are then combined with their first and second derivative to generate a 39-dimensional vector. In this manner, a frame of 729 39-dimensional vectors may be constructed from the speech data. Visualization of such a frame based on speech data having no warping (i.e., $\alpha=1$) is shown in FIG. 3.

Next, speech data may be warped along the frequency axis of the power spectrum, thereby generating speech data having a different vocal tract length characteristic. However, it is also envisioned that warped speech may be acquired using other known techniques. A second set of acoustic vectors is then extracted from the warped speech.

Since a linear solution does exist for warping, the least square method can be used to estimate the transformation matrix. To do so, the coefficients extracted from the unwarped speech are placed in a 729×39 matrix Y and the other coefficients extracted from the warped speech are placed in another matrix X. Assuming Y=NX, the direct least square formula provides the linear transform, N, between X and Y as follows:

$$N = (X^T X)^{-1} X^T Y \text{ or } A = (X^T W X)^{-1} X^T W Y.$$

Figure 4:
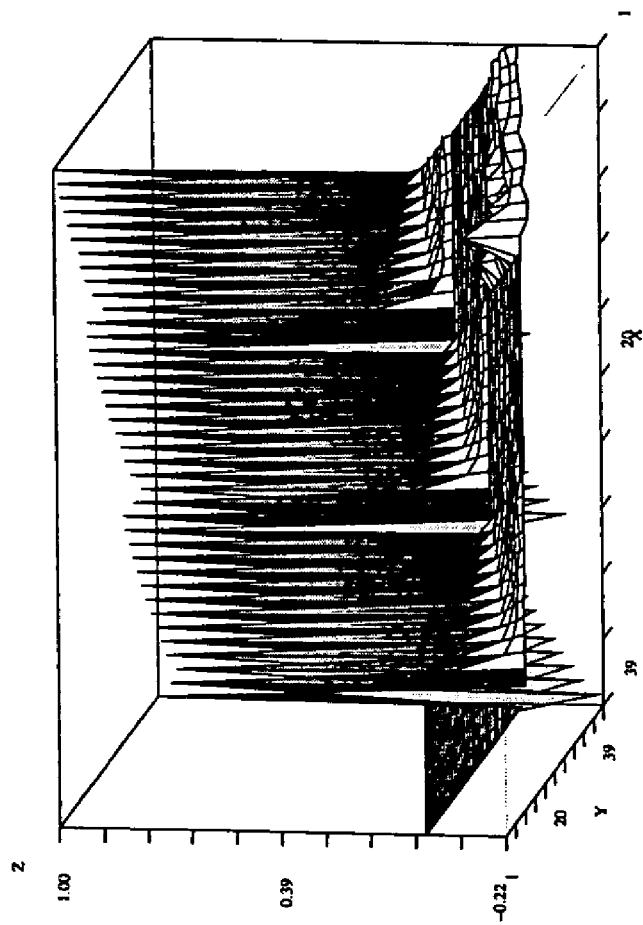
FIG. 4 is a graph illustrating an exemplary resulting transformation matrix resulting from the least square estimation technique of the present invention.

However, as computing the least square formula over the entire matrix (taking the first and second derivative coefficients into account) leads to ill-estimated matrices. Therefore it is sometimes beneficial to perform the least square estimation over the static parameters only. This leads to block-diagonal matrices that are closer to identity. Thus, a 13×13 matrix is estimated and the 39×39 is built like the matrix of equation denoted below. Finally, the best solution is given by performing the least square estimation over all the coefficients including the derivatives, but performing it over a relatively long period of time (e.g., typically more than one hour). As shown in FIG. 4, the resulting matrix is as follows:

$$\chi(t) \to \tilde{\chi}(t) = A\chi(t),$$

$$o(t) \to \tilde{o}(t) = No(t),$$

$$\tilde{o}(t) = No(t) \begin{bmatrix} A & 0 & 0 \\ 0 & A & 0 \\ 0 & 0 & A \end{bmatrix} \begin{bmatrix} \chi(t) \\ \chi'(t) \\ \chi''(t) \end{bmatrix}.$$

In VTLN, the speaker normalization is usually not performed as a transformation of the acoustic vectors, but by warping the power spectrum during signal analysis instead. The warping factor is usually determined by a maximum likelihood criterion. Expressing VTLN as a matrix transformation of the acoustic vector (x→Ax) enables us to take the Jacobian into account:

$$N(\chi | \mu, \Sigma) \to N(A\chi | \mu, \Sigma),$$

$$= N(\chi | A^{-1} A^{-T} \Sigma A^{-1}),$$

$$= \frac{1}{\sqrt{\det 2\pi A^{-T} \Sigma A^{-1}}} exp\{...\},$$

$$= \frac{|A|}{\sqrt{\det 2\pi \Sigma}} \exp\{...\},$$

where $$\exp\{...\} = \exp\left\{-\frac{1}{2}(x - A^{-1}\mu)^T (A^{-T}\Sigma A^{-1})^{-1}(x - A^{-1}\mu)\right\}.$$

For comparison, the number of words incorrectly decoded is the same with the linear assumption on the true warping factor as with the compressed spectrum from the traditional VTLN implementation. Moreover, the linear approach is more robust if you decode with a wrong warping factor. Thus, the linear approach combined with the least-square estimation of the matrix set is equivalent to the traditional VTLN implementation of VTLN on true warping factor. In addition, the warping factor is computationally very east to find.

Some speaker adaption or environment adaptation techniques employ estimation formulae which leads to a non-linear transformation of cepstral parameters. Such techniques include cumulative density function (CDF) matching or histogram correction and bilinear transforms. As with VTLN, these might be prone to unreliable estimation. Therefore, the technique for estimating a corresponding linear transform would stabilize results. If the transformed features are stored in a parameter matrix called Y and the original cepstral features are stored in a matrix X, then we can use the least square technique described above, replacing frequency warping with the non-linear transformation.

In any event, vocal tract length normalization is not as easy as it may appear. Variations of the scaling factor may be observed within speech from a single speaker. Unfortunately, it is computationally heavy to decode each parameter to compute the average warping factor for a given speaker. In any case, the Q-function maximization may be used with the least-square matrices embedded in that computation. The auxiliary function for HMM with Gaussian mixtures is:

$$Q = -\frac{1}{2} \sum_{t,m} \gamma_m(t) \{\log|R_m| + (\mu_m - o_t)^T R_m (\mu_m - o_t)\} \quad (9)$$

where $\gamma_m$ is a state posterior, $R_m$ is a precision matrix corresponding to Gaussian component m and $u_m$ is a mean vector corresponding to Gaussian component m. We wish to maximize Q with respect to A:

$$Q = -\frac{1}{2} \sum_{t,m} \gamma_m(t) \{\log|A_\alpha|^2 + (\mu_m - A_\alpha o_t)^T R_m (\mu_m - A_\alpha o_t)\}. \quad (10)$$

To optimize the computational requirements, Q is decomposed using the sufficient statistics(S) of that problem: S={$Acc_0$;$Acc_1$;$Acc_2$}. The maximization algorithm is now computationally very lightweight. For each speaker of the training set, compute Q(S, a) for each $\alpha \epsilon [0.86; 1.14]$ and then classify the speaker according to the result of that maximization. That way we produce $\alpha$-histograms and $\alpha$-lists over the training set. The following accumulators are the sufficient statistics of that problem:

$$Acc0 = \sum_{t,m} \gamma_m(t),$$

$$Acc1 = \sum_{t,m} \gamma_m(t) o_t,$$

$$Acc1 = \sum_{t,m} \gamma_m(t) o_t o_t^T.$$

Firstly, decompose Q to compute it during the training using the following sufficient statistics, S={Acc0; Acc1; Acc2}:

$$Q(S, \alpha) = -\frac{1}{2} \sum_{t,m} Acc_0 \{\log|A_\epsilon|^2 + (\mu_m^T R_m \mu_m)\} -$$

$$\frac{1}{2} \sum_{t,m} \{tr(Acc_1(\mu_m^T R_m A_\alpha)) + Acc_1^T (A_\alpha^T R_m \mu_m)\} -$$

$$\frac{1}{2} \sum_{t,m} tr(Acc_2(A_\alpha)^T R_m A_\alpha).$$

In this way, the above-described maximization algorithm may be used to split the speech data of the training database.

Partitioned speech data from training speakers having a similar speech characteristic are then grouped together. In the exemplary embodiment, speech data from the fifteen speaker α-lists are merged to form groups of speech data which may be referred to as "bubbles". Thus far, grouping strategies have been empirically derived. However, to ensure enough data to train a robust acoustic model, speech data from training speakers are preferably merged to form equilibrate bubbles. Thus, speech data from a training speaker may appear in none of the bubbles, only one bubble, or two or more of the bubbles.

Furthermore, it is further envisioned that speech data may be partitioned two or more times prior to being grouped together. Referring to FIG. 1, speech data is first partitioned based on the gender of the speaker as shown at 14. It is readily understood that the speech data may be tagged with an indicator of the speaker's gender. The speech data is then further partitioned at 16 based on the vocal tract length using the above-described maximization algorithm. While the above description was been provided with reference to specific speech related criteria, it is readily understood that different speech related criteria may be used to split the speech data.

Figure 5:
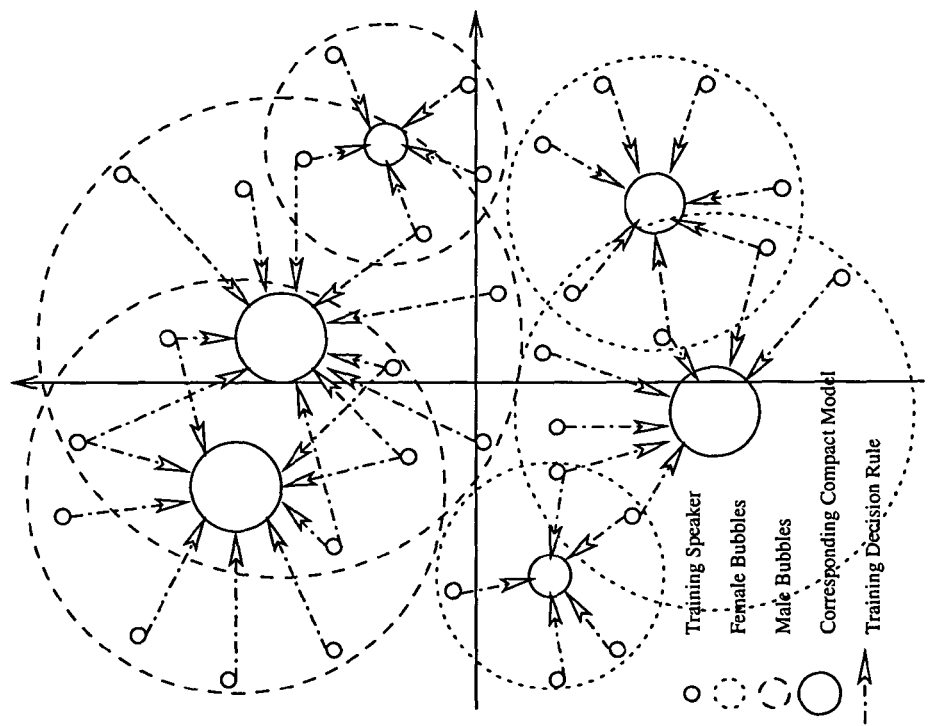
FIG. 5 is a diagram illustrating a bubble-splitting process in accordance with one exemplary embodiment of the present invention.

Lastly, the speech data is grouped together as shown at 18. In this exemplary embodiment, speech data is grouped into six groups: three male bubbles and three female bubbles. In particular, male speech data having a vocal tract length normalizing factor around one are grouped together, male speech data having a vocal tract length normalizing factor less than one are grouped together, and male speech data having a vocal tract length normalizing factor greater than one are grouped together. Female acoustic models are grouped in a similar manner. This bubble-splitting process is also graphically depicted in FIG. 5. Although this grouping is presently preferred, this is not intended as a limitation on the broader aspects of the present invention. On the contrary, different groupings may be suitable used and thus fall within the scope of the present invention. In addition, speech data may be grouped using the same speech related criteria as was used to split the speech data or another known similarity measure for assessing the speech data.

For each bubble, an acoustic bubble model is then trained as shown at 20 using the speech data within the bubble. Acoustic bubble models may be trained using various well known techniques. For instance, acoustic bubble models may be trained using maximum likelihood estimation. Alternatively, acoustic bubble models may also be constructed using various speaker adaptation techniques. Exemplary speaker adaptation techniques include (but are not limited to) maximum a posteriori (MAP) estimation or maximum likelihood linear regression (MLLR).

Although inter-speaker variation is reduced within an acoustic bubble model, such models may be further compacted using normalization techniques. Applying normalization techniques, such as speaker adaptive training (SAT) or inverse transform speaker adaptive training (IT-SAT), to the acoustic bubble models yields a very compact set of acoustic models. It is readily understood that other known normalization techniques are also within the scope of the present invention. As further described below, the compacted acoustic models may then be used to perform speech recognition.

Two additional normalization techniques are introduced below. The first technique will be referred to herein as speaker-normalized training (SNT). The basic idea is to replace the adaptation framework of SAT with a normalization framework. More specifically, the ATE phase of the framework is replaced with a MLLU feature transformation framework.

Figure 6A:
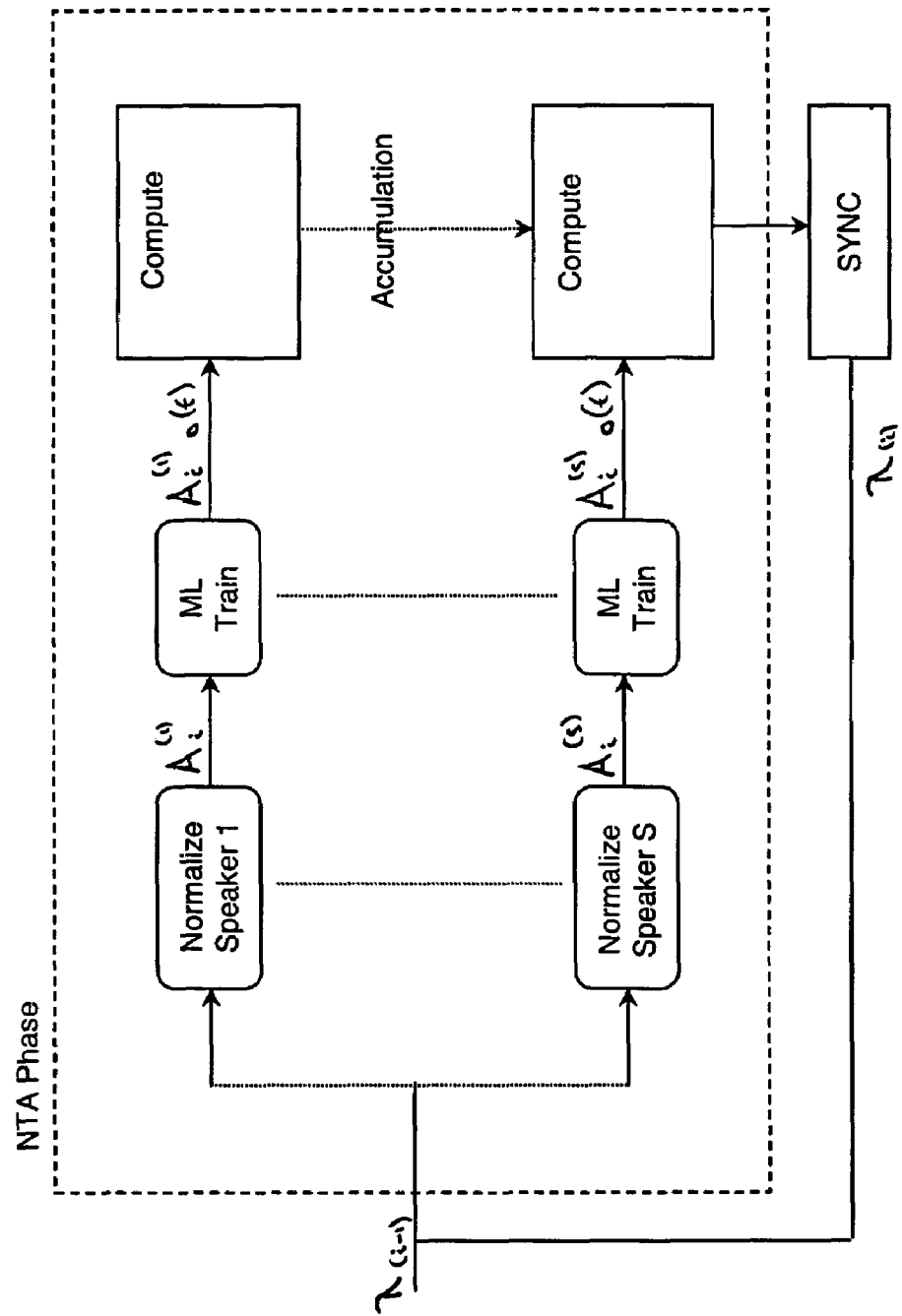
FIGS. 6A and 6B are block diagrams of the training cycle and the decoding process, respectively, of a speaker normalized training technique of the present invention.
Figure 6B:
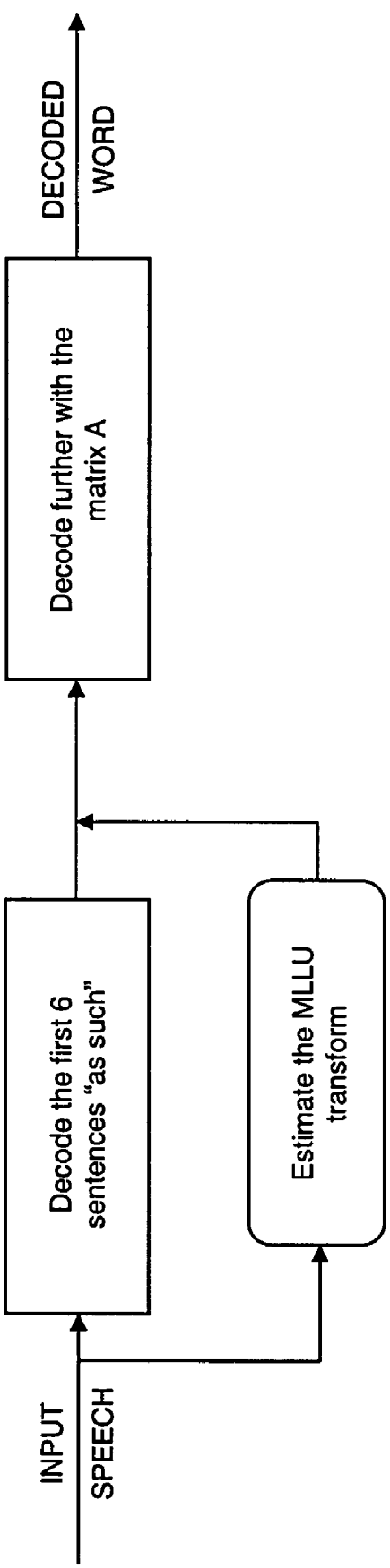

FIGS. 6A and 6B illustrate the training cycle and decoding cycle, respectively, of the SNT technique. The training cycle is comprised of two primary phases: a normalization-training-accumulation (NTA) phase, and a synchronization (sync) phase. Each phase is further described below.

In the NTA phase, given the speaker-independent model of the previous iteration $\lambda_{i-1}$, for each speaker s of the training set s∈[1 . . . S], first perform the MLLU feature transform: estimate $A_i^{(s)}$. Next, perform the ML adaptation over the normalized features:

$$\hat{o}(t) = A_i^{(s)} o(t). \tag{11}$$

and then accumulate the s-th SD model $\lambda_i^{(s)}$, namely $\{\mu_{jk}^{(s)}; \Sigma_{jk}^{(s)}; \gamma_{jk}^{(s)}\}$. I detail, we store the $\gamma_{jk}^{(s)}$ in a zero-th order accumulator and we store the $\mu_{jk}^{(s)}$ in a first order accumulator as follows:

$$\hat{\gamma}_{jk} = \sum_s \gamma_{jk}^{(s)}, \tag{12}$$

$$\hat{\mu}_{jk} = \sum_s \gamma_{jk}^{(s)} \mu_{jk}^{(s)}. \tag{13}$$

Finally, we store the variances to a second order accumulator. Before doing so, a small mathematical development is necessary:

$$\sigma_{jk}^2 = E[\|\mu_{jk} - o(t)\|^2] = E[o(t)^2] - \mu_{jk}^2. \tag{14}$$

Here we deal with Gaussian mixture model, so that:

$$E[o(t)^2] = \sum_N \gamma_{jk} E[o(t)^2 | \mu_{jk}] = \sum_N \gamma_{jk} [\sigma_{jk}^2 + \mu_{jk}^2], \tag{15}$$

Hence, in our second order accumulator, we store progressively the result of the above equation in Acc2.

After the previous NTA phase, we have stored accumulators that we use as input to the sync phase implementation:

$$\tilde{\mu}_{jk} = \frac{Acc1}{Acc0} = \frac{\sum s \gamma_{jk}^2 \mu_{jk}^{(s)}}{\sum s \gamma_{jk}^{(s)}}, \tag{16}$$

$$\tilde{\sigma}_{jk}^2 = E[o(t)^2] - \tilde{\mu}_{jk}^2 = Acc2 - \tilde{\mu}_{jk}^2. \tag{17}$$

Figure 7:
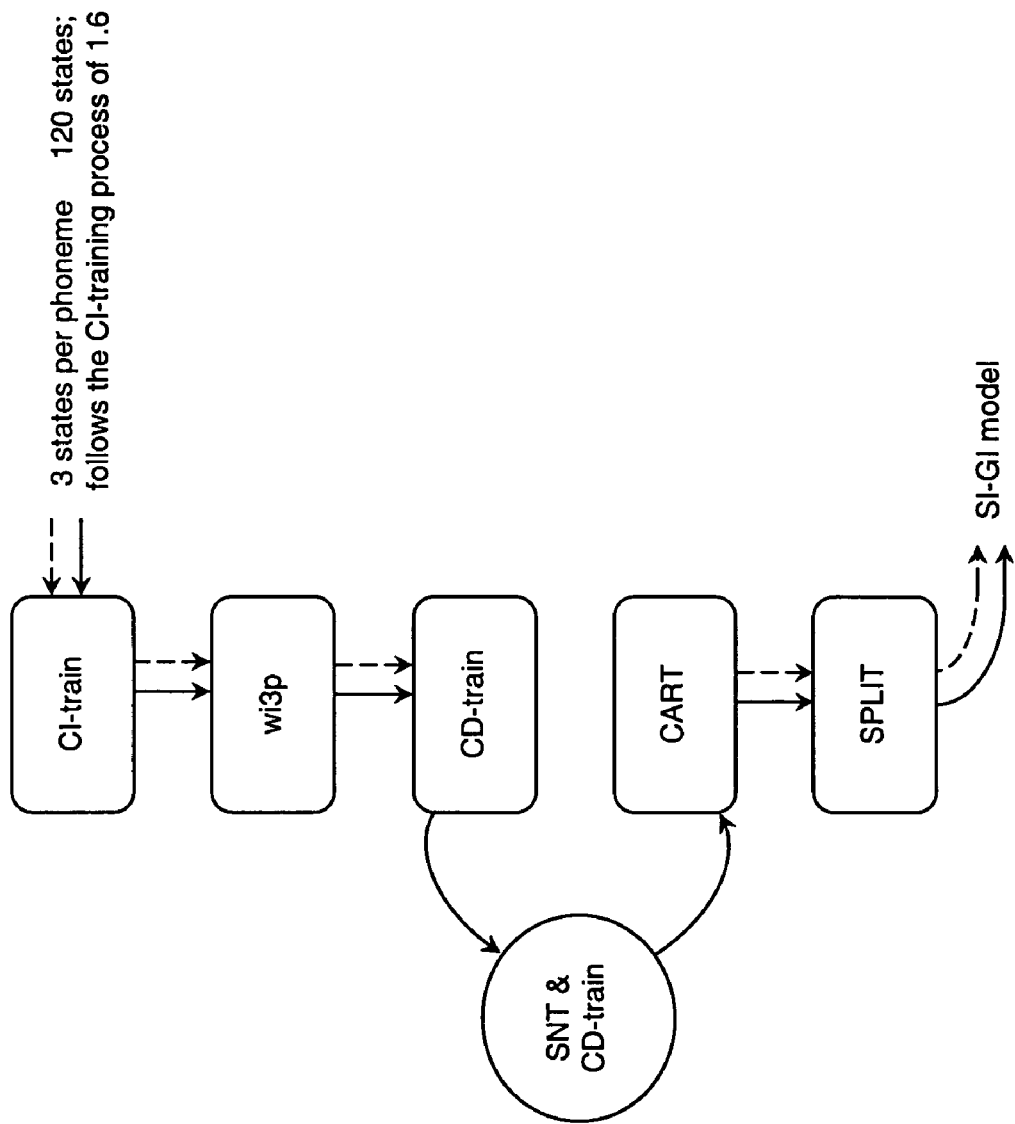
FIG. 7 is a block diagram showing a speech training process that incorporates the speaker normalized training technique of the present invention.

FIG. 7 shows that we can use this SNT technology earlier inside the training process (e.g. model building process). The use of hierarchical binary dichotomies for clustering is a proven approach with well-known efficiency. It is called classification and regression trees (CART). After having normalized the data, we hope to have more reliable clusters, leading to a more accurate Gaussian assumption throughout the CART step. Theoretically, we hope to obtain more pure cluster structures after performing SNT. Actually, this enables us to eliminate some parasite environmental mismatches that potentially could have been clustered according to those wrong parameters; whereas the CART method acts on better data (i.e. normalized data).

The second technique will be referred to as normalized speaker-adaptive training (NSAT). Likewise, the basic idea underlying NSAT is to add a normalization step in both the training and decoding procedure of SAT. With NSAT, we will perform the SAT training over the normalized features. Theoretically, we can hope that the clusters are more pure, that they are formed according to the best parameter, and that far less cluster will be formed according to any other kind of parasite environmental parameters.

Typically this phase consists exactly in performing the ATE phase of the ITSAT method taking the normalized features into account. In accordance with equation (12), the ITSAT re-estimation of the means becomes:

$$\mu_{jk}^{ITSAT} = \left\{ \sum_{s=1}^{S} \gamma_{jk}^{(s)} W^{(s,g)-1} \{\mu_{jk}^{(s)} - \beta^{(s,g)}\} \right\} \div \sum_{s=1}^{S} \gamma_{jk}^{(s)}, \quad (18)$$

where $\beta$ is the bias vector and $$\mu_{jk}^{(s)} = \frac{\sum_t \gamma_{jk}^{(s)} \hat{o}_t^{(s)}}{\sum_t \gamma_{jk}^{(s)}}; \hat{o}(t) = A_i^{(s)} o(t). \quad (19)$$

Figure 8:
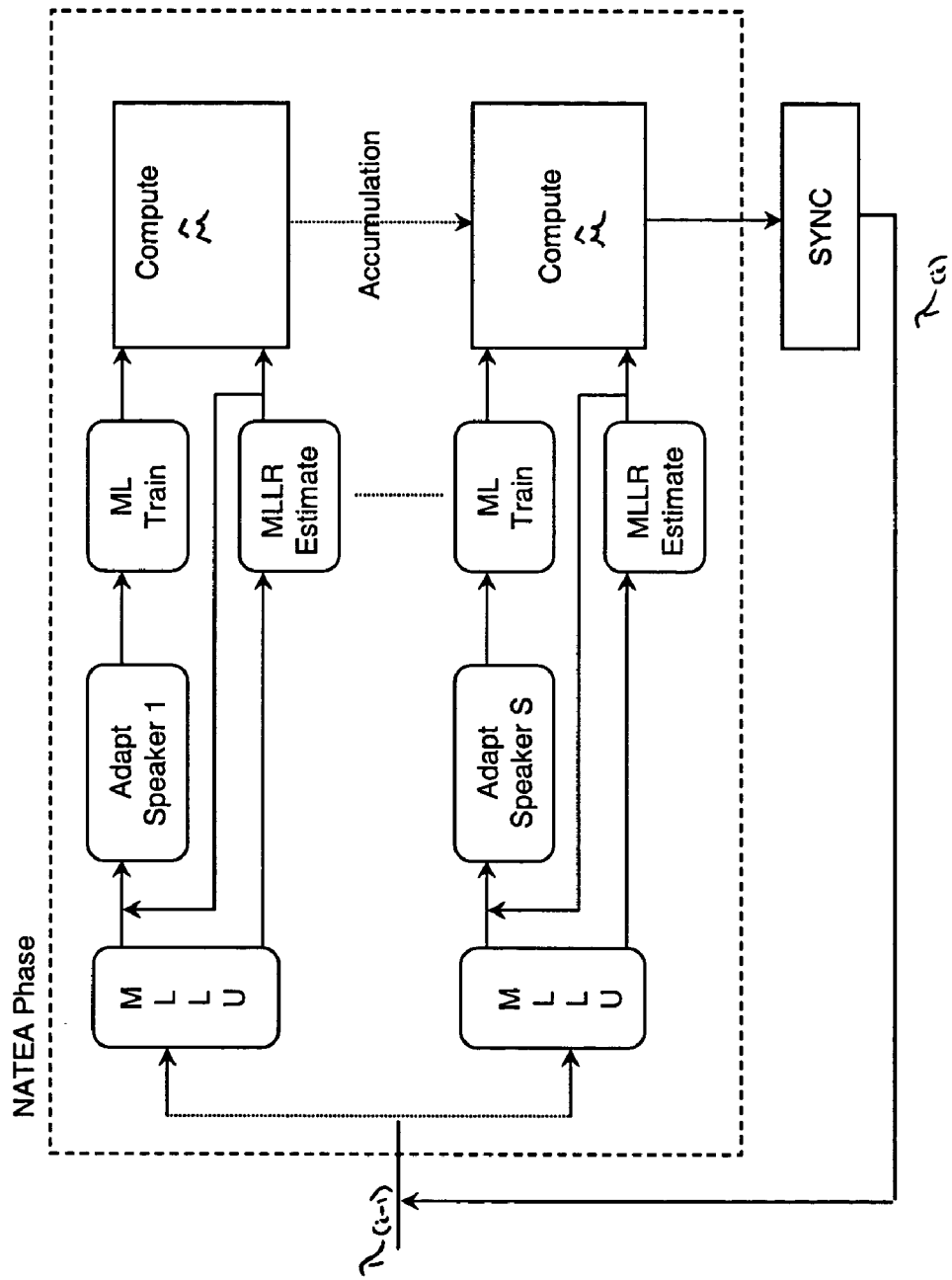
FIG. 8 is a block diagram of the training cycle of a normalized speaker-adaptive training technique of the present invention.

NATEA refers to normalization, adaptation, training, estimation, and accumulation. This step is the same as in SAT, the block diagram of the entire training cycle is shown in FIG. 8. Once again, the principle of this training is very similar to the SAT framework, we just perform ITSAT over normalized features. This phase is followed by the SYNC phase of SAT. The decoding process begins with this normalization step which consists of normalizing the input features, and continues with the adaptation step which simply consists of an MLLR adaptation. Either of these two additional normalization techniques may also be used to compact the acoustic bubble models.

To perform speech recognition, a compact acoustic model is first selected using the same criteria as was used to partition the training data. For instance, if the training data was partitioned based on vocal tract length, the applicable compact acoustic model is selected based on the vocal tract length associated with the input speech. In this instance, the vocal tract length for the input speech may be determined using the previously described maximization algorithm. The vocal tract length scaling factor is then compared to empirically derived thresholds in order to select the applicable compact acoustic model. The input speech is then decoded using the selected compact acoustic model.

In one exemplary embodiment, Q may be evaluated to the 15 values of the warping factor $\alpha$ for each entity to list (the parameters). That means that we evaluated the value of Q in equation 9 for each of the matrices. This computation is pretty heavy and unnecessary in many cases. Thus, it is readily understood that various known techniques, such as a Brent search, may be employed to optimize this processing. However, based on a priori knowledge of the function to maximize and the distribution of the maxima over the training databases (the a-histograms), we propose a new converging estimation technique.

Figure 9C:
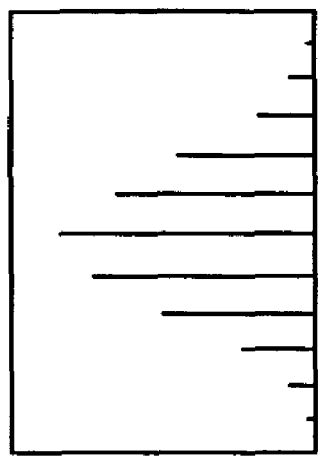
FIGS. 9A-9C are diagrams illustrating a converging evaluation technique of Q in accordance with the present invention.
Figure 9B:
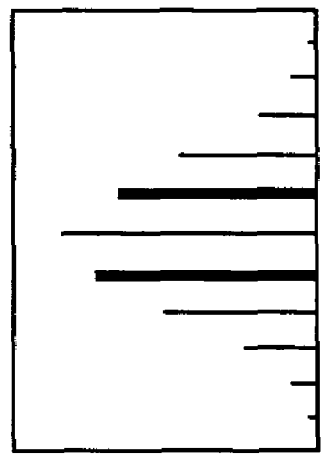
Figure 9A:
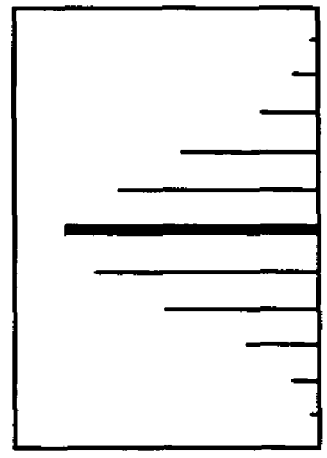

Referring to FIGS. 9A-9C, Q is first evaluated for the most likely values of a. Specifically, Q is evaluated for $\alpha$=0.98, 1.0 and 1.02. In most instances, this computation will confirm that the maximum is 1.0. In the remaining instance, this first computation indicates which side of the curve to proceed with the evaluations. Q continues to be evaluated until a maximum is found. In the worst case scenario, only 9 additional evaluations are performed. In sum, if N($\alpha$=i) is the number of Q-evaluations if the maximum is reached for $\alpha$=i, and P($\alpha$=i) is the posterior probability of a parameter to be assigned to that warping factor, then the average number of Q-evaluations for estimating the warping factor of a given parameter is $\epsilon$(N):

$$\varepsilon(N) = \sum_{i=0.86}^{i=1.14} P(\alpha = i) N(\alpha = i) < 5. \quad (20)$$

Thus, computation time is reduced by a factor of three.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for constructing acoustic models for use in a speech recognizer, comprising:

partitioning speech data from a plurality of training speakers according to at least one speech related criteria, wherein the step of partitioning speech data further comprises partitioning the speech data into male group data and female group data by labeling the speech data according to gender of the training speakers during training, and further partitioning the male group data by vocal tract length normalization factor for only the male group, and partitioning the female group data by vocal tract length normalization factor for only the female group;

grouping together the partitioned speech data from training speakers having similar speech characteristics, including gender and gender-specific vocal tract length normalization factor; and training an acoustic bubble model for each group using the speech data within the group.

2. The method of claim 1 further comprises grouping together speech data for training speakers having a vocal tract length normalizing factor around one, grouping together speech data for training speakers having a vocal tract length normalizing factor less than one, and grouping together speech data for training speakers having a vocal tract length normalizing factor greater than one.

3. The method of claim 1 wherein the step of grouping the partitioned speech data further comprises grouping the speech data such that speech data for a given speaker is placed in two or more groups of speech data.

4. The method of claim 1 wherein the step of training an acoustic bubble model further comprises applying maximum likelihood estimation to each group of speech data.

5. The method of claim 1 wherein the step of training an acoustic bubble model further comprises applying a maximum a posteriori (MAP) estimation to each group of speech data.

6. The method of claim 1 wherein the step of training an acoustic bubble model further comprises applying maximum likelihood linear regression (MLLR) to each group of speech data.

7. The method of claim 1 further comprises normalizing the acoustic bubble models, thereby yielding a set of compact acoustic bubble models.

8. The method of claim 7 wherein the step of normalizing the acoustic bubble models further comprises performing speaker adaptive training on each of the acoustic bubble models.

9. The method of claim 7 wherein the step of normalizing the acoustic bubble models further comprises performing inverse transform speaker adaptive training on each of the acoustic bubble models.

10. The method of claim 7 wherein the step of normalizing the acoustic bubble models further comprises performing speaker-normalized training on each of the acoustic bubble models, including performing a training cycle comprising a normalization-training-accumulation phase storing accumulators that serve as input to a synchronization phase of the training cycle.

11. The method of claim 7 wherein the step of normalizing the acoustic bubble models further comprises performing normalized speaker adaptive training on each of the acoustic bubble models in which a normalization step is added in both training and decoding procedures of sneaker adaptive training.

12. The method of claim 1 further comprises:
receiving an unknown speech utterance;
selecting an acoustic bubble model which most closely correlates to the unknown speech utterance; and
decoding the unknown speech utterance using the selected acoustic bubble model.

13. The method of claim 12 wherein the step of selecting an acoustic model further comprises selecting an acoustic bubble model using the speech related criteria used to partition the speech data.

* * * * *